(12) United States Patent
Chen et al.

(10) Patent No.: US 11,823,033 B2
(45) Date of Patent: Nov. 21, 2023

(54) CONDENSE-EXPANSION-DEPTH-WISE CONVOLUTIONAL NEURAL NETWORK FOR FACE RECOGNITION

(71) Applicant: Intel Corporation, Santa Clara, CA (US)

(72) Inventors: Yurong Chen, Beijing (CN); Jianguo Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 463 days.

(21) Appl. No.: 17/058,078

(22) PCT Filed: Sep. 13, 2018

(86) PCT No.: PCT/CN2018/105380
§ 371 (c)(1),
(2) Date: Nov. 23, 2020

(87) PCT Pub. No.: WO2020/051816
PCT Pub. Date: Mar. 19, 2020

(65) Prior Publication Data
US 2021/0200993 A1    Jul. 1, 2021

(51) Int. Cl.
*G06K 9/00*    (2022.01)
*G06N 3/063*    (2023.01)
(Continued)

(52) U.S. Cl.
CPC .......... *G06N 3/063* (2013.01); *G06F 18/213* (2023.01); *G06N 3/04* (2013.01); *G06N 3/08* (2013.01);
(Continued)

(58) Field of Classification Search
CPC .......... G06N 3/063; G06N 3/04; G06N 3/08; G06N 3/045; G06N 3/048; G06N 3/084;
(Continued)

(56) References Cited

U.S. PATENT DOCUMENTS 9,436,895 B1    9/2016 Jones et al.
2018/0137406 A1*    5/2018 Howard .................. G06N 3/04
(Continued)

FOREIGN PATENT DOCUMENTS

CN    107316015    11/2017
CN    108171112    6/2018
(Continued)

OTHER PUBLICATIONS

Zheng et al.; Merging and Evolution Networks for Mobile Vision Applications; (Jun. 2018); IEEE vol. 6; pp. 31294-31306 (Year: 2018).*
(Continued)

*Primary Examiner* — Jerome Grant, II
(74) *Attorney, Agent, or Firm* — Akona IP PC

(57) ABSTRACT

Techniques related to implementing convolutional neural networks for face or other object recognition are discussed. Such techniques may include applying, in turn, a depth-wise separable convolution, a condense point-wise convolution, and an expansion point-wise convolution to input feature maps to generate output feature maps such that the output from the expansion point-wise convolution has more channels than the output from the condense point-wise convolution.

20 Claims, 11 Drawing Sheets

(51) Int. Cl.
G06N 3/04 (2023.01)
G06N 3/08 (2023.01)
G06V 40/16 (2022.01)
G06F 18/213 (2023.01)
G06V 10/82 (2022.01)
G06V 10/32 (2022.01)

(52) U.S. Cl.
CPC .............. *G06V 10/32* (2022.01); *G06V 10/82* (2022.01); *G06V 40/161* (2022.01); *G06V 40/168* (2022.01); *G06V 40/172* (2022.01)

(58) Field of Classification Search
CPC ...... G06F 18/213; G06V 10/32; G06V 10/82; G06V 40/161; G06V 40/168; G06V 40/172
USPC .......................................................... 382/118
See application file for complete search history.

(56) References Cited

U.S. PATENT DOCUMENTS

2018/0165543 A1* 6/2018 Mody ................... G06V 10/431
2018/0173571 A1* 6/2018 Huang .................... G06N 3/063

FOREIGN PATENT DOCUMENTS

WO 2018003212 1/2018
WO WO2020051816 * 3/2020 ............... G06T 7/00

OTHER PUBLICATIONS

Office Action for Japanese Patent Application No. 2020-568233, dated Oct. 4, 2022.
International Preliminary Report on Patentability for PCT Application No. PCT/CN2018/105380, dated Mar. 25, 2021.
Extended European Search Report for European Patent Application No. 18933598.7, dated Mar. 30, 2022.
He, Z., et al., "BD-NET: A Multiplication-Less DNN with Binarized Depthwise Separable Convolution", 2018 IEEE Computer Society Annual Symposium on VLSI (ISVLSI), Jul. 8, 2018.
Ouppaphan, P., "Corn Disease Identification from Leaf Images Using Convolutional Neural Networks", 2017 21st International Computer Science and Engineering Conference (ICSEC), IEEE, Nov. 15, 2017.
Qin, Z., et al., "Merging and Evolution: Improving Convolutional Neural Networks for Mobile Applications", 2018 International Joint Conference on Neural Networks (IJCNN), IEEE Jul. 8, 2018.
Zhao, R., et al. , "Towards Efficient Convolutional Neural Network for Domain-Specific Applicaitons on FPGA", 2018 28th International Conference on Field Programmable Logic and Applications, IEEE, Aug. 27, 2018.
International Search Report and Written Opinion for PCT Application No. PCT/CN2018/105380, dated Jun. 17, 2019.
"BluFR benchmark", retrieved online via http://www.cbsr.ia.ac.cn/users/sclia/projects/blufr/ on Nov. 13, 2020.
"LFW Benchmark", retrieved online via http://vis-www.cs.umass.edu/lfw/ on Nov. 13, 2020.
Deng, J. et al., "ArcFace: Additive Angular Margin Loss for Deep Face Recognition", arXiv:1801.07698, 2018.
He, K.M. et al., "Deep residual learning for image recognition", arXiv:1512.03385, 2015.
Howard, Andrew G. et al., "MobileNets: Efficient Convolutional Neural Networks for Mobile Vision Applications", https://arxiv.org/abs/1704.04861, Apr. 17, 2017.
Parkhi, et al., "Deep face recognition", British Machine Vision Conference, 2015.
Schroff, F. et al., "Facenet: A unified embedding for face recognition and clustering", CVPR, 2015.
Sun, Y. et al., "Deep learning face representation from predicting 10,000 classes", CVPR, 2014.
Taigman, Y. et al., "Deepface: Closing the gap to human-level performance in face verification", CVPR, 2014.
Wen, et al., "A discriminative feature learning approach for deep face recognition", ECCV, 2016.
Xie, S. et al., "Aggregated Residual Transformations for Deep Neural Networks", https://arxiv.org/abs/1611.05431, Apr. 11, 2017.
Office Action from Japanese Patent Application No. 2020-568233 dated Apr. 25, 2023, 4 pgs.

* cited by examiner

CONDENSE-EXPANSION-DEPTH-WISE CONVOLUTIONAL NEURAL NETWORK FOR FACE RECOGNITION

CLAIM OF PRIORITY

This Application is a National Stage Entry of, and claims priority to, PCT Application No. PCT/CN2018/105380, filed on 13 Sep. 2018 and titled "CONDENSE-EXPANSION-DEPTH-WISE CONVOLUTIONAL NEURAL NETWORK FOR FACE RECOGNITION", which is incorporated by reference in its entirety for all purposes.

BACKGROUND

Face recognition techniques include applying a pretrained convolutional neural network (CNN) to input images. Such CNN based face recognition systems provide high quality results in some implementations. However, they suffer from large model size and large computing costs, which makes implementation in resource-limited environments, such as in edge computing devices, difficult. For example, implementation in smart cameras, handheld devices, and digital surveillance equipment may not be possible due to the large memory, computing, and power resources that are required. For example, when implemented in mobile devices, such CNN implementations may consume computing resources such that battery life is degraded to unacceptable levels.

It may be advantageous to face recognition or, more generally, object recognition with high accuracy, and with less computational and memory resource requirements in a variety of contexts. It is with respect to these and other considerations that the present improvements have been needed. Such improvements may become critical as the desire to perform face or object recognition in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
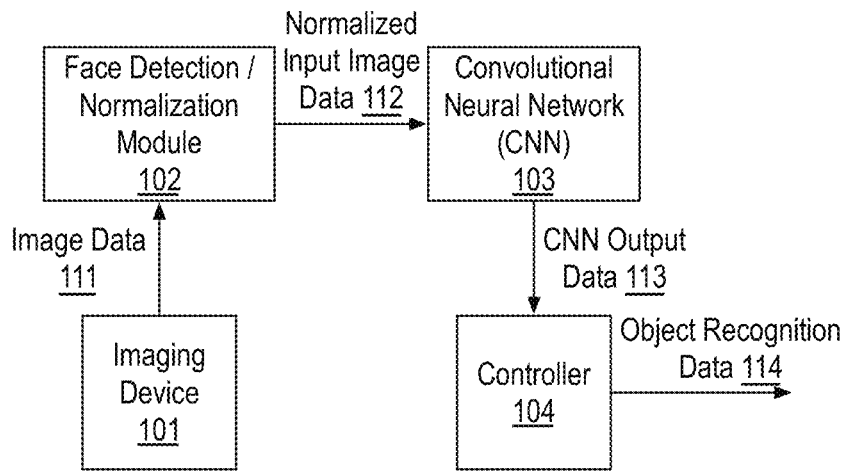
FIG. 1 illustrates an example device for performing object recognition using a CNN having a condense-expansion-depth-wise stage.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein. As used herein the terms "approximately" or "substantially" indicate a deviation from the target value of +/−5% unless otherwise specified.

Methods, devices, apparatuses, computing platforms, and articles are described herein related to face recognition using convolutional neural networks with depth-wise separable convolution, condense point-wise convolution, and expansion point-wise convolution operations.

As described above, it may be advantageous to perform semantic object recognition such as face recognition in a variety of contexts. In face recognition, systems provide face identification (i.e., identifying a face as one of N subjects) and/or face verification (i.e., verifying a face belongs to a particular person). For example, face identification may be useful in identifying faces in images and albums of images, surveillance, etc. and face verification may be useful in security such as unlocking locked devices. As is discussed herein, a convolutional neural network (CNN) for object recognition input image data applies, to input feature maps, a depth-wise separable convolution to generate multiple separate 2D feature maps, a condense point-wise convolution to separate 2D feature maps to generate multiple first combined feature maps having a first number of channels, and an expansion point-wise convolution to the first combined feature maps to generate second combined feature maps having second number of channels greater than the first number of channels. Such processing may be performed at one or more stages of the CNN and the input feature maps may be from any previous CNN stage.

Such techniques, and additional techniques discussed herein, provide an ultra-efficient object recognition (e.g., face recognition) system based on a condense-expansion-depth-wise network (CEDNet). CNNs discussed herein (i.e., CEDNet) may be implemented in any context, and, in particular, may be advantageous for resource-limited devices (e.g., computing resource limited, memory resource limited, battery life resource limited, etc.) such as edge computing devices, mobile devices, etc. In some embodiments, the discussed CNNs have fewer than 130 million #MAdd (multiply-add) operations such that the computing cost is reduced with respect to prior CNNs (e.g., up to 1/115 computing cost reduction) while recognition accuracy is maintained.

FIG. 1 illustrates an example device 100 for performing object recognition using a CNN having a condense-expansion-depth-wise stage, arranged in accordance with at least some implementations of the present disclosure. As shown in FIG. 1, device 100 includes an imaging device 101, a face detection and normalization module 102, a convolutional neural network (CNN) module 103, and a controller 104. Device 100 may be implemented in any suitable form factor device such as motor vehicle platform, a robotics platform, a personal computer, a laptop computer, a tablet, a phablet, a smart phone, a digital camera, a gaming console, a wearable device, a display device, an all-in-one device, a two-in-one device, or the like. For example, device 100 may perform object recognition as discussed herein.

As shown, imaging device 101 attains image data 111. Imaging device 101 may be any suitable imaging device such as an RGB camera or the like. In some embodiments, device 100 receives image data 111 or normalized input image data 112 from another device via a communications channel (not shown). In some embodiments, image data 111 is attained for processing from a memory (not shown) of device 100. Image data 111 may include any suitable picture, frame, or the like or any data structure representing a picture or frame at any suitable resolution. In an embodiment, image data 111 is RGB image data having R (red), G (green), and B (blue), values for pixels thereof. In an embodiment, image data 111 is RGB-D image data having R, G, B, D (depth) values for pixels thereof. In an embodiment, imaging device 101 is a 3D imaging device. For example, imaging device 101 may include a left camera, a right camera, and an IR transmitter such that the IR transmitter projects an IR texture pattern onto a scene and an IR texture pattern residual from the left and right camera is used to perform stereoscopy to generate depth values of image data 111. In an embodiment, image data 111 is single channel infra-red image data having a single value (e.g., an intensity value) at each pixel thereof (e.g., a thermogram).

Image data 111 is received by face detection and normalization module 102 and face detection and normalization module 102, using image data 111, performs facial detection using any suitable technique or techniques such as landmark detection to generate a bounding box around the face (if any). Face detection and normalization module 102 detects face(s) within image data 111 and normalizes image data corresponding to the detected face(s) to a predetermined size and/or scale to generate normalized input image data 112. In an embodiment, image data 111 includes, for example, a query face for face recognition including face identification or face verification.

Figure 2:
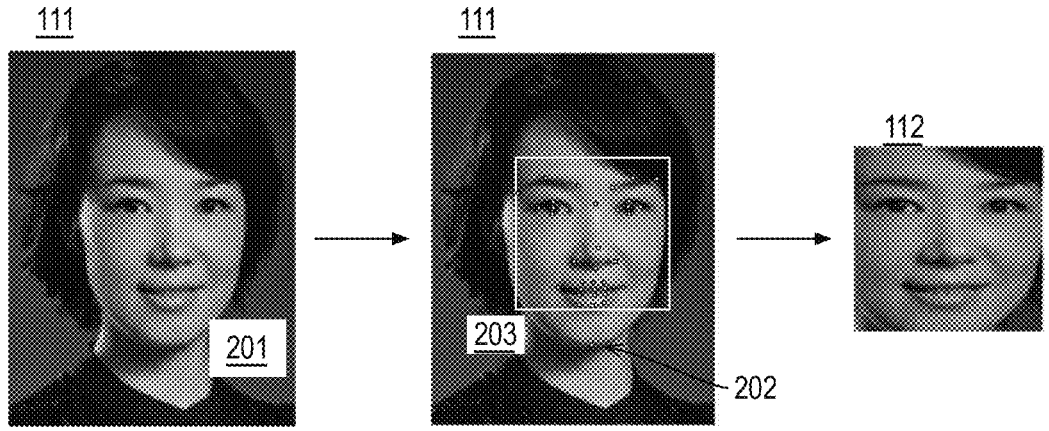
FIG. 2 illustrates example face detection and normalization.

FIG. 2 illustrates example face detection and normalization, arranged in accordance with at least some implementations of the present disclosure. As shown in FIG. 2, image data 111 includes a representation of a face 201. Face detection is performed using image data 111 using any suitable technique or techniques such as facial landmark detection techniques, Viola-Jones object detection framework based on Haar features and cascade classifiers, histogram of oriented gradients (HOGs) based classifiers, etc. As shown, in some embodiments, landmark points 202 (only one of which is labeled for the sake of clarity) are detected and located based on such face detection techniques and such landmark points (and/or other techniques) are used to generate a bounding box 203 corresponding to face 201. Based on bounding box 203 and landmark points 202, normalized input image data 112 is generated. For example, face detection and normalization module 102 may crop and adjust image data 111 to generate normalized input image data 112 at a common size and scale for processing by CNN module 103.

Normalized input image data 112 may include any suitable data structure. In an embodiment, normalized input image data 112 has a single channel (e.g., gray scale image data) such that normalized input image data 112 has a single value for each pixel thereof. In an embodiment, normalized input image data 112 has three color channels (e.g., RGB image data) such that normalized input image data 112 has three values (e.g., an R value, a G value, and a B value) for each pixel thereof. Although discussed herein with respect to RGB image data, any suitable image data format (e.g., YUV, YCbCr, etc.) may be used. In an embodiment, normalized input image data 112 has three color channels and a depth channel (e.g., RGB-D image data) such that normalized input image data 112 has four values (e.g., an R value, a G value, a B value, and a D value) for each pixel thereof. Although discussed herein with respect to RGB-D depth image data, any suitable depth image data format may be used. Furthermore, normalized input image data 112 may have any suitable size. In an embodiment, normalized input image data 112 may represent any suitable size of normalized image such as a 128×128 pixel normalized image, a 100×100 pixel normalized image, a 160×160 pixel normalized image, etc.

Returning to FIG. 1, normalized input image data 112 is received by CNN module 103, which applies a CNN as discussed herein to normalized input image data 112 to generate CNN output data 113. CNN output data 113 may include any suitable data structure such as an N-dimensional vector with each value indicating a likelihood or score that a feature is within normalized input image data 112. As shown, CNN output data 113 is provided to controller 104, which receives CNN output data 113 and generates object recognition data 114. Object recognition data 114 includes any suitable data structure indicating an object (such as a face) is identified for verified in normalized input image data 112. For example, object or face recognition may be divided into identification and verification in practical implementation.

Object or face identification corresponds to a 1:N matching problem such that normalized input image data 112 may be attempted to be matched to one of N subjects. For example, a backend database may contain more N subjects each with about K images and associated identities. Object or face identification finds the best match to normalized input image data 112 and, if the best matching score is larger than pre-defined threshold, for example, object recognition data 114 includes an indicator identifying the best match subject. In an embodiment, if the matching score is less than the threshold, no match is provided. In such embodiments, controller 104 receives CNN output data 113 and determines a best match based on CNN output data 113 (e.g., by comparing CNN output data 113 to output data for the N available subjects), optionally compares the score of the best match to a threshold, and, if the score of the best match compares favorably to the threshold, indicates the match via object recognition data 114. For example, object recognition data 114 may include an identifier indicating a best facial match for normalized input image data 112 in face identification contexts. Such best facial match data may be used by device 100 to tag a photo with a name, to identify a person under surveillance, etc.

Object or face verification targets corresponds to a 1:1 matching problem such that normalized input image data 112 may be attempted to be matched to a particular, single subject. For example, a backend database may store several images from the subject and, for a query face, a determination is made as to whether normalized input image data 112 includes the subject or not. Thereby, object or face verification determines whether normalized input image data 112 corresponds to the subject. For example, CNN output data 113 may be compared to output data for the subject using a sum of square differences and comparison to a threshold or similar techniques. In such embodiments, controller 104 receives CNN output data 113, determines whether a match is found, and, if so, indicates the match via object recognition data 114. For example, object recognition data 114 may include an identifier indicating whether or not facial match for normalized input image data 112 is made face verification contexts. Such data indicating a match or not may be used by device 100 to allow or reject access to device 100 (e.g., to provide device access through face matching).

Figure 3:
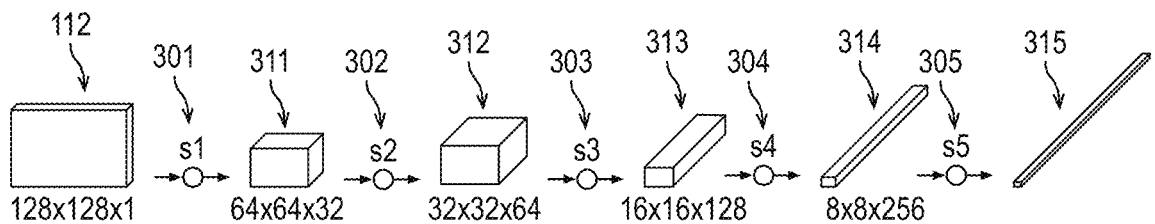
FIG. 3 illustrates an example convolutional neural network.

FIG. 3 illustrates an example convolutional neural network 300, arranged in accordance with at least some implementations of the present disclosure. As shown in FIG. 3, convolutional neural network (CNN) 300 includes multiple stages 301, 302, 303, 304, 305, which are labeled as s1, s2, s3, s4, s5, respectively. As shown, stage 301 (s1) receives normalized input image data 112, which is illustrated as 128×128 pixels of a single channel (e.g., grayscale). However, normalized input image data 112 may include any suitable input image data discussed herein. As shown, stage 301 (s1) operates on normalized input image data 112 to generate feature maps 311. In the illustrated embodiment, feature maps 311 include 64×64 element feature maps for 32 output channels. That is, feature maps 311 include 32 feature maps each having 64×64 (4,096) feature values. However, any size of feature maps for any number of output channels may be used. For example, stage 301 (s1) receives a data volume having dimensions of 128×128×1 and outputs a data volume having dimensions of 64×64×32.

Stage 301 (s1) generates feature maps 311 using any suitable convolutional technique or techniques. In an embodiment, stage 301 (s1) generates feature maps 311 using standard convolutional techniques such that 32, for example, kernels are each applied to locations within normalized input image data 112. Each kernel may be any suitable size such as 3×3, 5×5, etc. with each kernel being the same size or kernels being different sizes. Stage 301 (s1) may also include pooling, scaling, and/or rectified linear unit (ReLU) operations as is known in the art. Furthermore, in embodiments where normalized input image data 112 includes multiple channels, each kernel may be summed across the channels at each location within normalized input image data 112. For example, a standard convolution in a CNN is a multi-channel and multi-kernel convolution. For a convolution layer having 'n' input channels (e.g., the number of channels of normalized input image data 112) and 'm' output channels (e.g., the number of channels of feature maps 311), with kernel-size k×k=$k^2$. For each output channel (i.e., for each kernel), standard convolution performs 2D convolution for each input channel and adds all 'n' convolution results as the output response.

Stage 302 (s2) receives feature maps 311 as input and generates feature maps 312 as output using any suitable convolutional technique or techniques. For example, stage 302 (s2) may generate feature maps 312 using depth-wise-condense-expansion convolutions as discussed herein below. In an embodiment, depth-wise-condense-expansion convolution includes three steps.

First, a depth-wise separable convolution is applied to input feature maps (e.g., feature maps 311) to generate multiple separate 2D feature maps. As used herein, the term depth-wise separable convolution indicates a convolution that does not sum, average, or otherwise exchange information across input channels. The term separate 2D feature maps indicates feature maps performed by a convolution that does not sum, average, or otherwise exchange information across input channels. For example, the depth-wise separable convolution applies, to 'n' input channel depth maps, 'm' k×k×1 kernels to generate 'm' separate 2D feature maps.

Second, a condense point-wise convolution is applied to the 'm' separate 2D feature maps to generate 'n/g' combined feature maps such that the combined feature maps have n/g channels. As used herein, the term combined feature maps is used to indicate feature maps that have been generated by sharing information across the input channels. For example, 'n/g' 1×1×m kernels are applied to the separate 2D feature maps to generate the first combined feature maps.

Third, an expansion point-wise convolution is applied to the 'n/g' combined feature maps to generate 'n' combined feature maps such that the combined feature maps have n channels. As used herein, the term condense is used to indicate the number of output channels is reduced and the term expansion is used to indicate the number output channels is increased. For example, 'g' may be characterized as a condense factor such that the ratio of the number of channels after expansion to the number channels prior to expansion (and after condense) is 'g'. For example, 'n' 1×1×(n/g) kernels are applied to the first combined feature maps to generate second combined feature maps. Such depth-wise-condense-expansion convolutions provide a variety of advantages as discussed further herein. At a particular stage, such as stage 302 (s2), the discussed depth-wise-condense-expansion convolutions may be performed once (as discussed with respect to FIG. 4), with optional pooling, scaling, and/or ReLU operations or multiple times (such as twice as discussed with respect to FIG. 8) to stack them at a stage.

As shown, in an embodiment, stage 302 (s2) receives a data volume having dimensions of 164×64×32 and outputs a data volume having dimensions of 32×32×64. However, any suitable data sizes may be used. Furthermore, CNN 300 includes additional stages 303, 304, 305. Stages 303, 304, 305 receive feature maps 312, 313, 314, respectively, as input and generate feature maps 313, 314 and feature vector 315 as output using any suitable convolutional technique or techniques. For example, any of stages 301, 302, 303, 304, 305 may use standard convolution techniques discussed herein. As will be appreciated, feature maps 311, 312, 313, 314 and feature vector 315 are associated with normalized input image data 112 and image data 111 in that they are generated when processing input image data 112 and/or image data 111. Furthermore, any of stages 301, 302, 303, 304, 305 may use depth-wise-condense-expansion convolutions (either single or stacked) as discussed herein. In addition, any of stages 301, 302, 303, 304, 305 may use depth-wise separable convolutions and point-wise convolutions without condense-expansion. For example, depth-wise separable convolutions and point-wise convolutions may first apply per-channel 2D convolutions that output separate 2D feature map and then mix each channel with the others using 1×1 or point-wise convolution.

As shown, in an embodiment, stage 303 (s3) receives a data volume of feature maps 312 having dimensions of 32×32×64 and outputs a data volume of feature maps 313 having dimensions of 16×16×128, stage 304 (s4) receives a data volume of feature maps 313 having dimensions of 16×16×128 and outputs a data volume of feature maps 314 having dimensions of 8×8×256, and stage 305 (s5) receives a data volume of feature maps 314 having dimensions of 8×8×256 and outputs a one-dimensional feature vector 315 having any number of elements. However, any suitable feature maps numbers and sizes (e.g., volumes) and feature vector sizes may be used.

In the illustrated embodiment, CNN 300 includes five stages, however, CNN 300 may include any number of stages such as 4, 6, 7, or more. Furthermore, each successive stage of CNN 300 outputs feature maps of decreasing size and increasing number of channels. Such processing may increase the abstraction of features detected by CNN 300 across stages 301, 302, 303, 304, 305.

Figure 4:
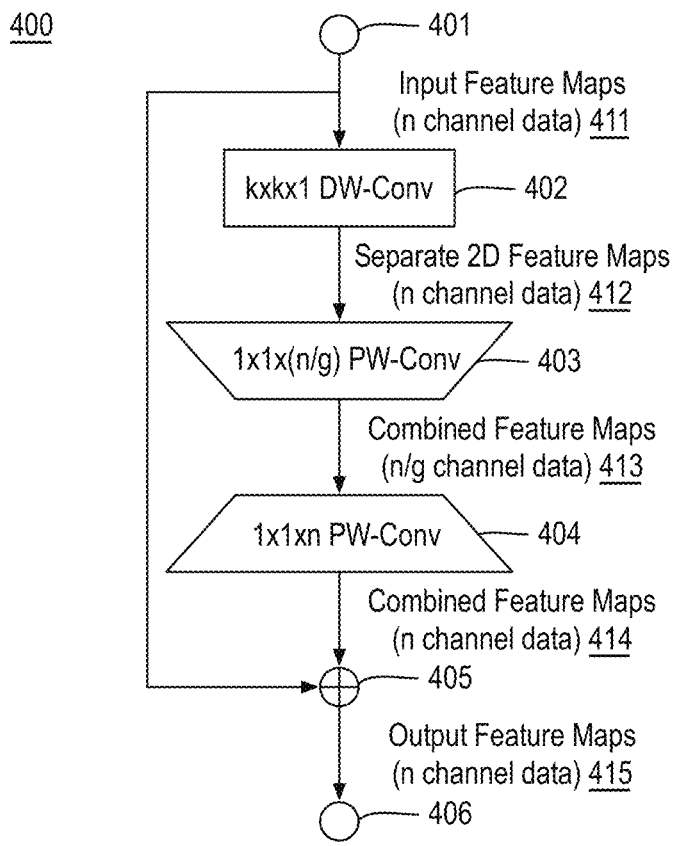
FIG. 4 illustrates an example convolutional neural network stage including example depth-wise-condense-expansion convolutions.

FIG. 4 illustrates an example convolutional neural network stage 400 including example depth-wise-condense-expansion convolutions, arranged in accordance with at least some implementations of the present disclosure. As shown in FIG. 4, convolutional neural network (CNN) stage 400 includes an input 401, a depth-wise convolution (DW-Conv) module 402, a point-wise condense convolution (PW-Conv) module 403, a point-wise expansion convolution (PW-Conv) module 404, an optional adder 405, and an output 406. CNN stage 400 may be implemented via any CNN stage discussed herein.

As shown, CNN stage 400, via input 401, receives, for example from a previous CNN stage, input feature maps 411 such that input feature maps 411 have 'n' channels. Furthermore, input feature maps 411 may have any suitable size such that input feature maps 411 provide an input volume to CNN stage. For example, input feature maps 411 may each have H×W elements and input feature maps 411 may have 'n' channels such that input feature maps 411 have an H×W×n data volume. For example, input feature maps 411 may be 64×64×32, 42×32×64, 16×16×128, 8×8×256 as discussed herein, although any suitable dimensions may be used.

Depth-wise convolution module 402 receives input feature maps 411 and applies a depth-wise separable convolution to input feature maps 411 to generate multiple separate 2D feature maps 412. For example, depth-wise convolution module 402 applies a per-channel 2D convolution that outputs 'n' separate 2D feature maps 412 using 'n' convolution kernels of size k×k×1 such that there is no information exchange between the input channels. As discussed, such separate 2D feature maps 412 are generated without adding, averaging, or otherwise exchanging information across the 'n' input channels of input feature maps 411. Such processing may be contrasted with standard convolutional processing, which adds or averages across channels.

Figure 5:
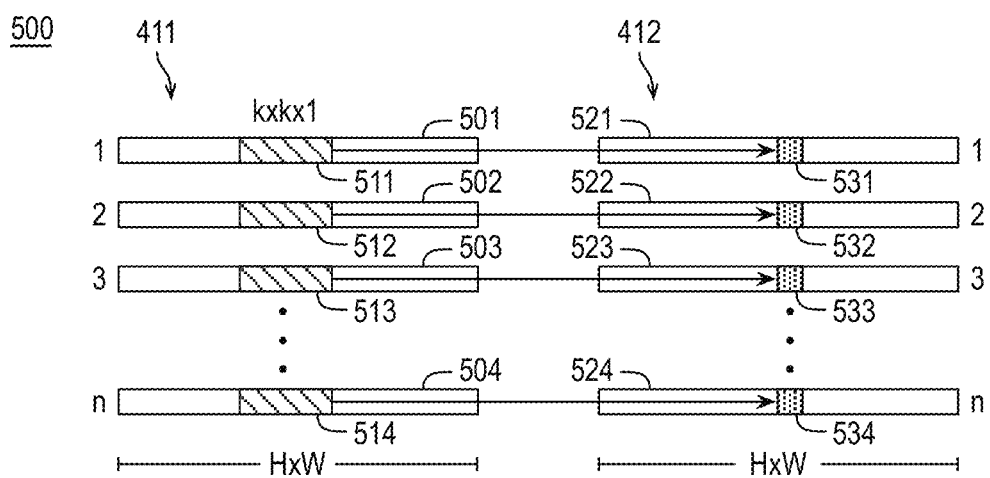
FIG. 5 illustrates an example depth-wise separable convolution.

FIG. 5 illustrates an example depth-wise separable convolution 500, arranged in accordance with at least some implementations of the present disclosure. As shown in FIG. 5, input feature maps 411 include 'n' feature maps 501, 502, 503, 504 (also labeled 1, 2, 3, n), each of which has H×W elements or features. That is, a linear cross-section of each of feature maps 501, 502, 503, 504 is illustrated in FIG. 5. As shown, a kernel of size k×k×1 is applied to each of feature maps 501, 502, 503, 504 such that 'n' kernels such as kernels 511, 512, 513, 514 are applied to feature maps 501, 502, 503, 504, respectively, to generate 'n' separate 2D feature maps 521, 522, 523, 524, of size H×W to provide separate 2D feature maps 412. As discussed, separate 2D feature maps 521, 522, 523, 524 are generated without any cross-channel information exchange between feature maps 501, 502, 503, 504. Kernels 511, 512, 513, 514 may be of any suitable size or sizes such as 3×3, 5×5, etc. and separate 2D feature maps 521, 522, 523, 524, may be of any suitable size.

As shown, at a particular location of feature map 501, kernel 511 is applied by convolving kernel 511 with the feature values of feature map 501 at the location to generate a feature value 531 of separate 2D feature map 521. The location of kernel 511 is then moved and the process is repeated using the feature values of feature map 501 at the new location to generate another feature value, and so on throughout feature map 501. Each of feature maps 502, 503, 504 are processed in a similar manner by kernels 512, 513, 514, respectively, to generate feature values such as feature values 532, 533, 534 of separate 2D feature maps 522, 523, 524.

Returning to FIG. 4, point-wise condense convolution module 403 receives separate 2D feature maps 412 and applies a point-wise convolution to separate 2D feature maps 412 to generate combined feature maps 413. For example, point-wise condense convolution module 403 applies a linear mix across channels using 'n/g' 1×1×n convolutions.

Figure 6:
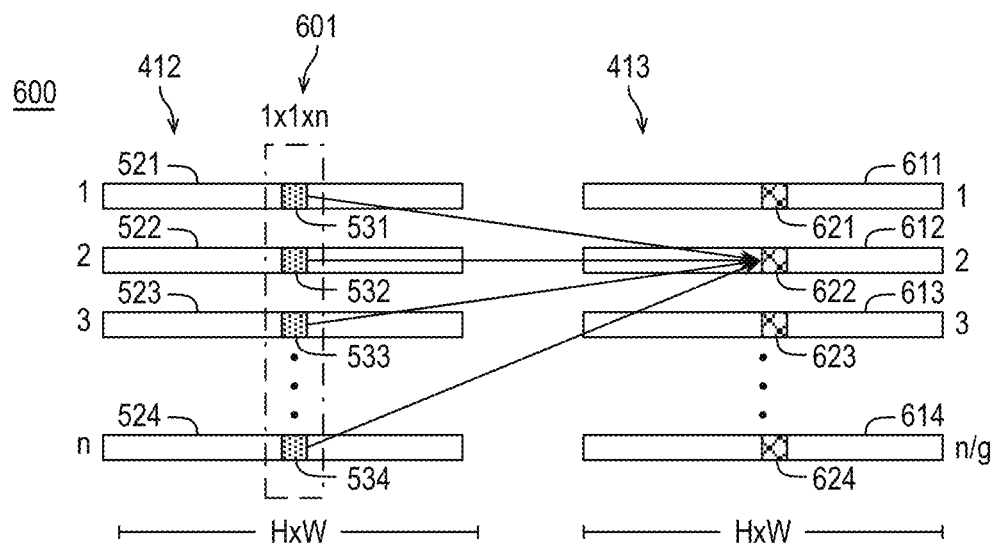
FIG. 6 illustrates an example point-wise condense convolution.

FIG. 6 illustrates an example point-wise condense convolution 600, arranged in accordance with at least some implementations of the present disclosure. As shown in FIG. 6, separate 2D feature maps 412 include 'n' separate feature maps 521, 522, 523, 524 (also labeled 1, 2, 3, n), generated as discussed with respect to FIG. 5 such that each has H×W elements or features. That is, a linear cross-section of each of separate feature maps 521, 522, 523, 524 is illustrated in FIGS. 5 and 6. As shown, a kernel 601 of size 1×1×n is applied across separate feature maps 521, 522, 523, 524 to generate values or features of, for example, combined feature map 612. For example, kernel 601 is applied at a particular position across separate feature maps 521, 522, 523, 524 and kernel 601 is convolved with feature values 531, 532, 533, 534 corresponding to the particular position to generate feature value 622 of combined feature map 612.

Kernel 601 is then moved throughout separate feature maps 521, 522, 523, 524 with a feature value of combined feature map 612 being generated at each position. Similarly, another 1×1×n kernel is applied across separate feature maps 521, 522, 523, 524 to generate feature value 621 and by moving throughout separate feature maps 521, 522, 523, 524, each feature value of combined feature map 611. In like fashion, each value of combined feature map 613 (including feature value 623), combined feature map 614 (including feature value 624), and all other 'n/g' combined feature maps 413 are generated. For example, 'n/g' kernels such as kernel 601 are applied to separate feature maps 521, 522, 523, 524 to generate combined feature maps 413 with 'n/g' output channels. As discussed, combined feature maps 611, 612, 613, 614 are generated with cross-channel information exchange between separate feature maps 521, 522, 523, 524. As used herein, the term combined with reference to feature maps indicate feature maps generated with information exchange across the input channels.

As shown, the point-wise condense convolution condenses the 'n' channels of separate 2D feature maps 412 to 'n/g' channels such that 'g', which is characterized as a condense factor herein, is an integer greater than one. The condense factor, 'g' may be any suitable integer value greater than one such as 2, 4, or 8, with 4 being particularly advantageous.

Returning to FIG. 4, point-wise expansion convolution module 404 receives combined feature maps 413 and applies a point-wise expansion convolution to combined feature maps 413 to generate combined feature maps 414. For example, point-wise condense convolution module 403 applies a linear mix across channels using 'n' 1×1×(n/g) convolutions.

Figure 7:
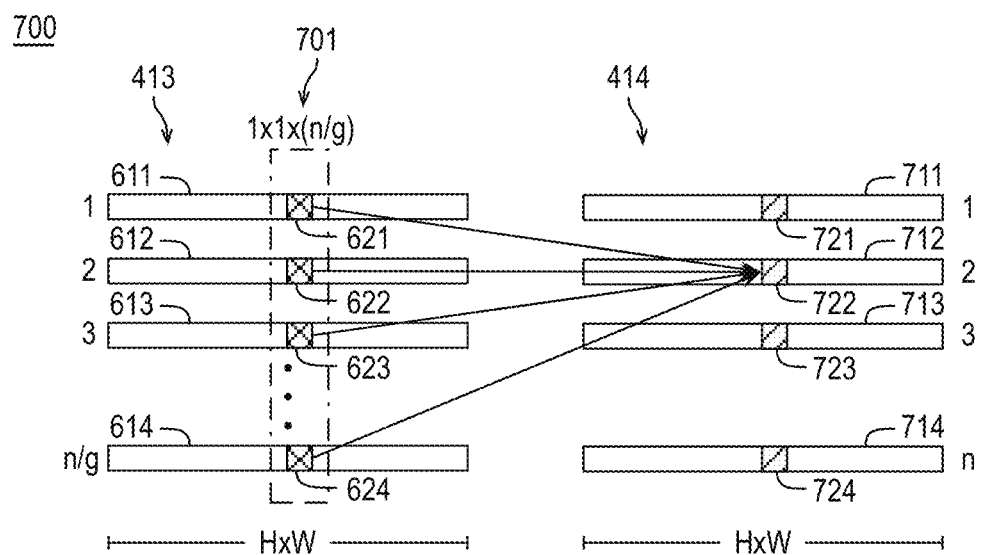
FIG. 7 illustrates an example point-wise expansion convolution.

FIG. 7 illustrates an example point-wise expansion convolution 700, arranged in accordance with at least some implementations of the present disclosure. As shown in FIG. 7, combined feature maps 413 include 'n/g' combined feature maps 611, 612, 613, 614 (also labeled 1, 2, 3, n/g), generated as discussed with respect to FIG. 6 such that each has H×W elements or features. That is, a linear cross-section of each of combined feature maps 611, 612, 613, 614 is illustrated in FIGS. 6 and 7. As shown, a kernel 701 of size 1×1×(n/g) is applied across combined feature maps 611, 612, 613, 614 to generate values or features of, for example, combined feature map 712. For example, kernel 701 is applied at a particular position across combined feature maps 611, 612, 613, 614 and kernel 701 is convolved with feature values 621, 622, 623, 624 corresponding to the particular position to generate feature value 722 of combined feature map 712.

Kernel 701 is then moved throughout combined feature maps 611, 612, 613, 614 with a feature value of combined feature map 712 being generated at each position. Similarly, another 1×1×(n/g) kernel is applied across combined feature maps 611, 612, 613, 614 to generate feature value 721 and by moving throughout combined feature maps 611, 612, 613, 614, each feature value of combined feature map 711. In like fashion, each value of combined feature map 713 (including feature value 723), combined feature map 714 (including feature value 724), and all other 'n' combined feature maps 414 are generated. For example, 'n' kernels such as kernel 701 are applied to combined feature maps 611, 612, 613, 614 to generate combined feature maps 414 with 'n' output channels. As discussed, combined feature maps 711, 712, 713, 714 are generated with cross-channel information exchange between separate combined feature maps 611, 612, 613, 614. As shown, the point-wise expansion convolution expands the 'n/g' channels of combined feature maps 413 to 'n' channels in combined feature maps 414.

Returning to FIG. 4, adder 405 receives combined feature maps 414 and sums combined feature maps 414 with input feature maps 411 to generate output feature maps 415. For example, CNN stage 400, via adder 405, provides residual connection by adding feature maps 414 with input feature maps 411. Such residual connections may provide for CNN stage to estimate changes in features, which may be easier to estimate and train. However, in some embodiments, adder 405 is not implemented and CNN stage outputs combined feature maps 414.

As discussed, depth-wise-condense-expansion convolutions may be provided within a stage of a CNN. Notably, the point-wise condense convolution layer (e.g., applied at point-wise condense convolution module 403) condenses the 'n' channel output of the depth-wise convolution layer (e.g., separate 2D feature maps 412) into 'n/g' output channels (e.g., combined feature maps 413) such that g (the condense factor) is greater than 1 (e.g., g=4). Such a point-wise condense convolution advantageously reduces redundancy among the channels of the depth-wise convolution layer output and reduces computations as discussed further herein. Furthermore, residual connections are provided by adding (e.g., via adder 405) combined feature maps 414 with input feature maps 411. To ensure the residual summation is workable, input feature maps 411 and combined feature maps 414 have the same resolution (e.g., H×W) and the same number channels (e.g., 'n'). To provide for the same resolution of input feature maps 411 and combined feature maps 414, expansion is provided by point-wise expansion convolution module 404 such that the number of input channels of combined feature maps 413 is 'n/g' while the number of output channels of combined feature maps 414 is still 'n'.

Such processing techniques provide low computational resource requirements and storage requirements as the number of CNN parameters are reduced. For example, assuming a convolutional stage having 'n' input channels, 'n' output channels, W×H feature map sizes, and $k^2$ kernel size, standard convolutional processing requires a computing complexity of $w*h*k^2*n^2$; depth-wise and point-wise convolution without condense and expansion and without residual summation requires a computing complexity of $w*h*(k^2*n+n^2)$; depth-wise and point-wise convolution without condense and expansion with residual summation requires a computing complexity of $w*h*(k^2*n+n^2+n)$; and depth-wise-condense-expansion convolution with residual summation requires a computing complexity of $w*h*(k^2*n+n^2/g+n^2/g+n)$. Further assuming a condense factor, 'g' of 4, the computing cost reduction with respect to standard convolutional processing is $9n(10+n)$ and the computing cost reduction with respect to depth-wise and point-wise convolution without condense and expansion and without residual summation is $(10+n)/(10+n/2)$. Therefore, for smaller n with n=100, the techniques discussed herein speed up over standard convolutional processing by 8.2× and over depth-wise and point-wise convolution without condense and expansion and without residual summation by 1.8×. For larger n with n=500, the techniques discussed herein speed up over standard convolutional processing by 8.8× and over depth-wise and point-wise convolution without condense and expansion and without residual summation by 1.96×. Furthermore, the discussed techniques require fewer CNN model parameters and improved CNN convergence during training.

Figure 8:
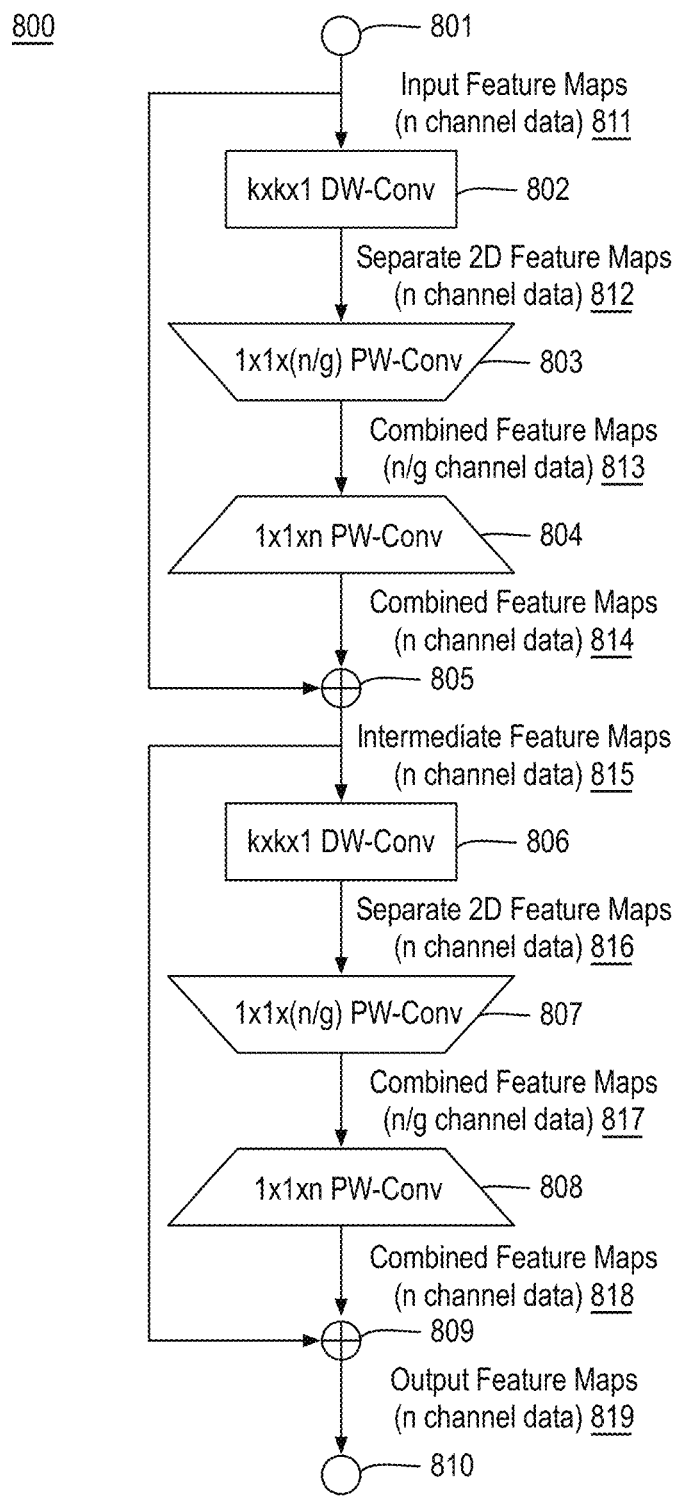
FIG. 8 illustrates an example convolutional neural network stage including multiple example depth-wise-condense-expansion convolutions.

FIG. 8 illustrates an example convolutional neural network stage 800 including multiple example depth-wise-condense-expansion convolutions, arranged in accordance with at least some implementations of the present disclosure. As shown in FIG. 8, convolutional neural network (CNN) stage 800 includes an input 801, a depth-wise convolution (DW-Conv) module 802, a point-wise condense convolution (PW-Conv) module 803, a point-wise expansion convolution (PW-Conv) module 804, an optional adder 805, a depth-wise convolution (DW-Conv) module 806, a point-wise condense convolution (PW-Conv) module 807, a point-wise expansion convolution (PW-Conv) module 808, an optional adder 809, and an output 810. CNN stage 800 may be implemented via any CNN stage discussed herein.

CNN stage 800 receives, via input 801, for example from a previous CNN stage, input feature maps 811 such that input feature maps 811 have 'n' channels. Furthermore, input feature maps 811 may have any suitable size such that input feature maps 811 provide an input volume to CNN stage. For example, input feature maps 811 may each have H×W elements and input feature maps 811 may have 'n' channels as discussed herein. Depth-wise convolution module 802 receives input feature maps 811 and applies a depth-wise separable convolution to input feature maps 811 to generate multiple separate 2D feature maps 812. Depth-wise convolution module 802 applies a per-channel 2D convolution that outputs 'n' separate 2D feature maps 812 using 'n' convolution kernels of size k×k×1 such that there is no information exchange between the input channels as discussed with respect to FIG. 5. Point-wise condense convolution module 803 receives separate 2D feature maps 812 and applies a point-wise condense convolution to separate 2D feature maps 812 to generate combined feature maps 813 having 'n/g' channels by applying 'n/g' 1×1×n convolutions to separate 2D feature maps 812 as discussed with respect to FIG. 6. Point-wise expansion convolution module 804 receives combined feature maps 813 and applies a point-wise expansion convolution to combined feature maps 813 to generate combined feature maps 814 having 'n' channels by applying 'n' 1×1×(n/g) convolutions to separate combined feature maps 813 as discussed with respect to FIG. 7. Adder 805 receives combined feature maps 814 and sums combined feature maps 814 with input feature maps 811 to generate intermediate feature maps 815. In some embodiments, adder 805 may not be implemented and combined feature maps 814 are provided to depth-wise convolution module 806.

Depth-wise convolution module 802 receives intermediate feature maps 815 (or combined feature maps 814) and applies a depth-wise separable convolution to intermediate feature maps 815 (or combined feature maps 814) to generate multiple separate 2D feature maps 816. Depth-wise convolution module 806 applies a per-channel 2D convolution that outputs 'n' separate 2D feature maps 816 using 'n' convolution kernels of size k×k×1 such that there is no information exchange between the input channels as discussed with respect to FIG. 5. Point-wise condense convolution module 807 receives separate 2D feature maps 816 and applies a point-wise condense convolution to separate 2D feature maps 816 to generate combined feature maps 817 having 'n/g' channels by applying 'n/g' 1×1×n convolutions to separate 2D feature maps 816 as discussed with respect to FIG. 7. Point-wise expansion convolution module 808 receives combined feature maps 817 and applies a point-wise expansion convolution to combined feature maps 817 to generate combined feature maps 818 having 'n' channels by applying 'n' 1×1×(n/g) convolutions to separate combined feature maps 817 as discussed with respect to FIG. 7. Adder 805 receives combined feature maps 818 and sums combined feature maps 818 with intermediate feature maps 815 (or input feature maps 811) to generate output feature maps 819. In some embodiments, adder 805 and adder 805 are not implemented and combined feature maps 818 are output from CNN stage 800.

Figure 9A:
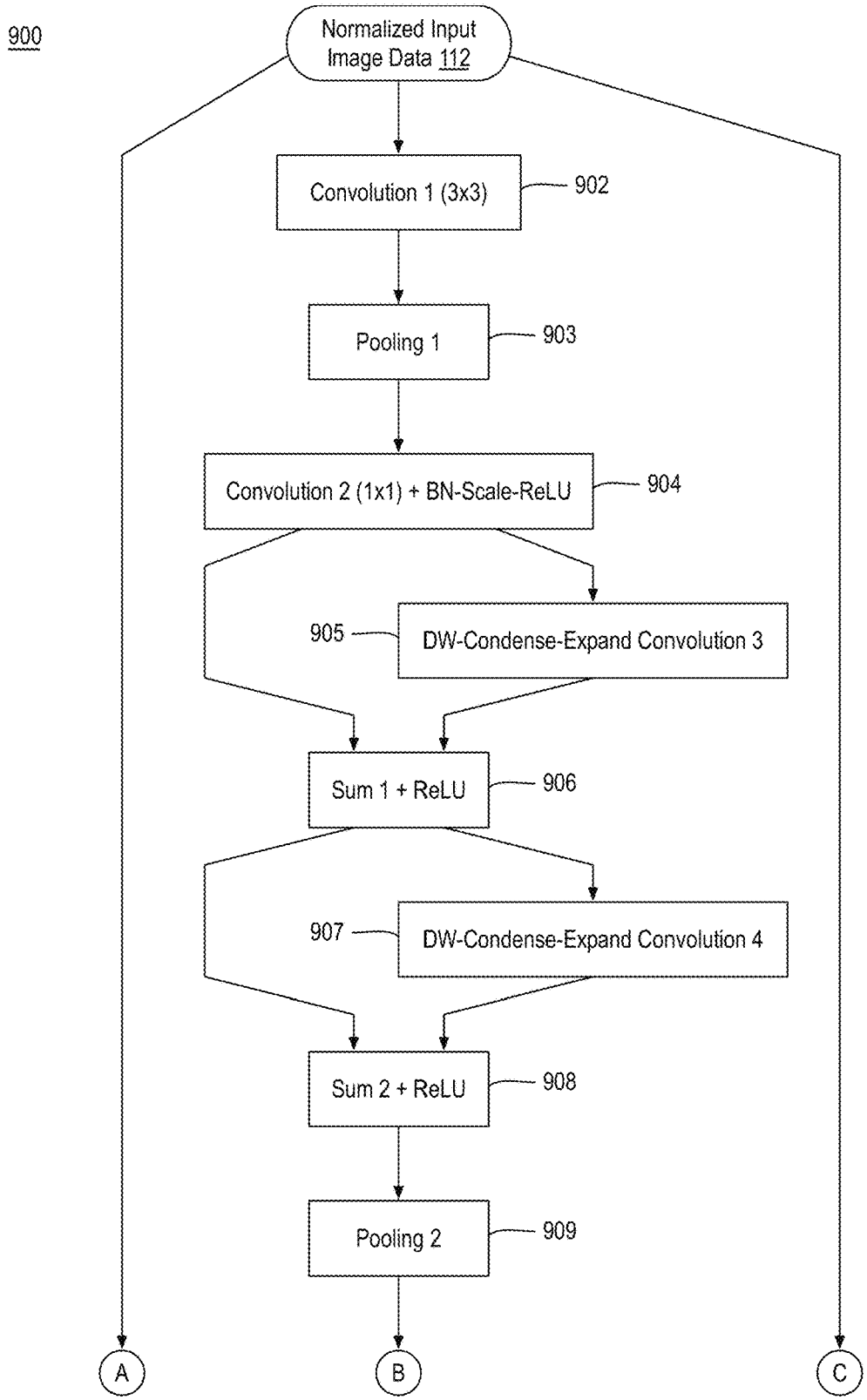
FIGS. 9A, 9B, and 9C illustrates an example convolutional neural network.
Figure 9B:
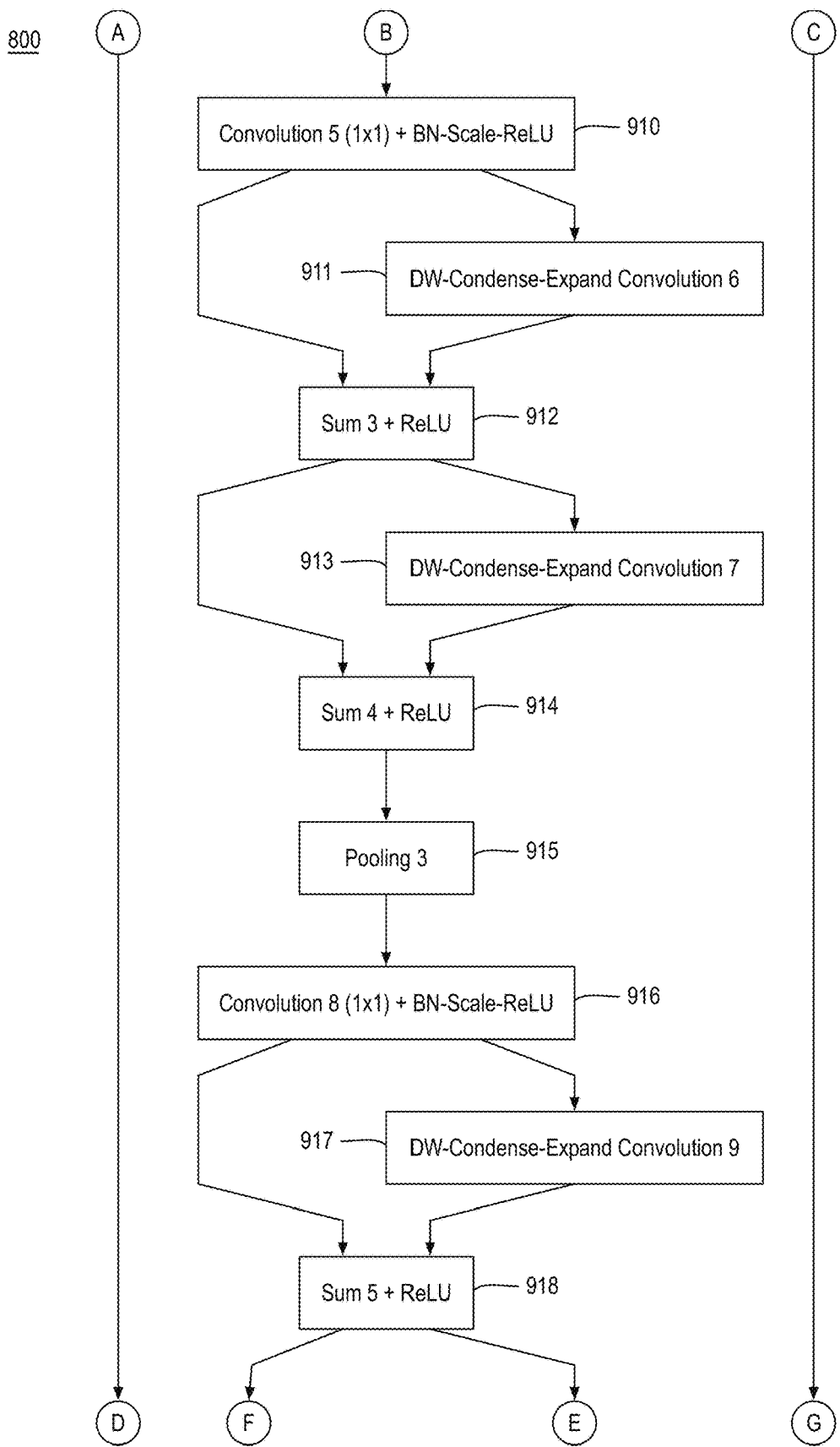
Figure 9C:
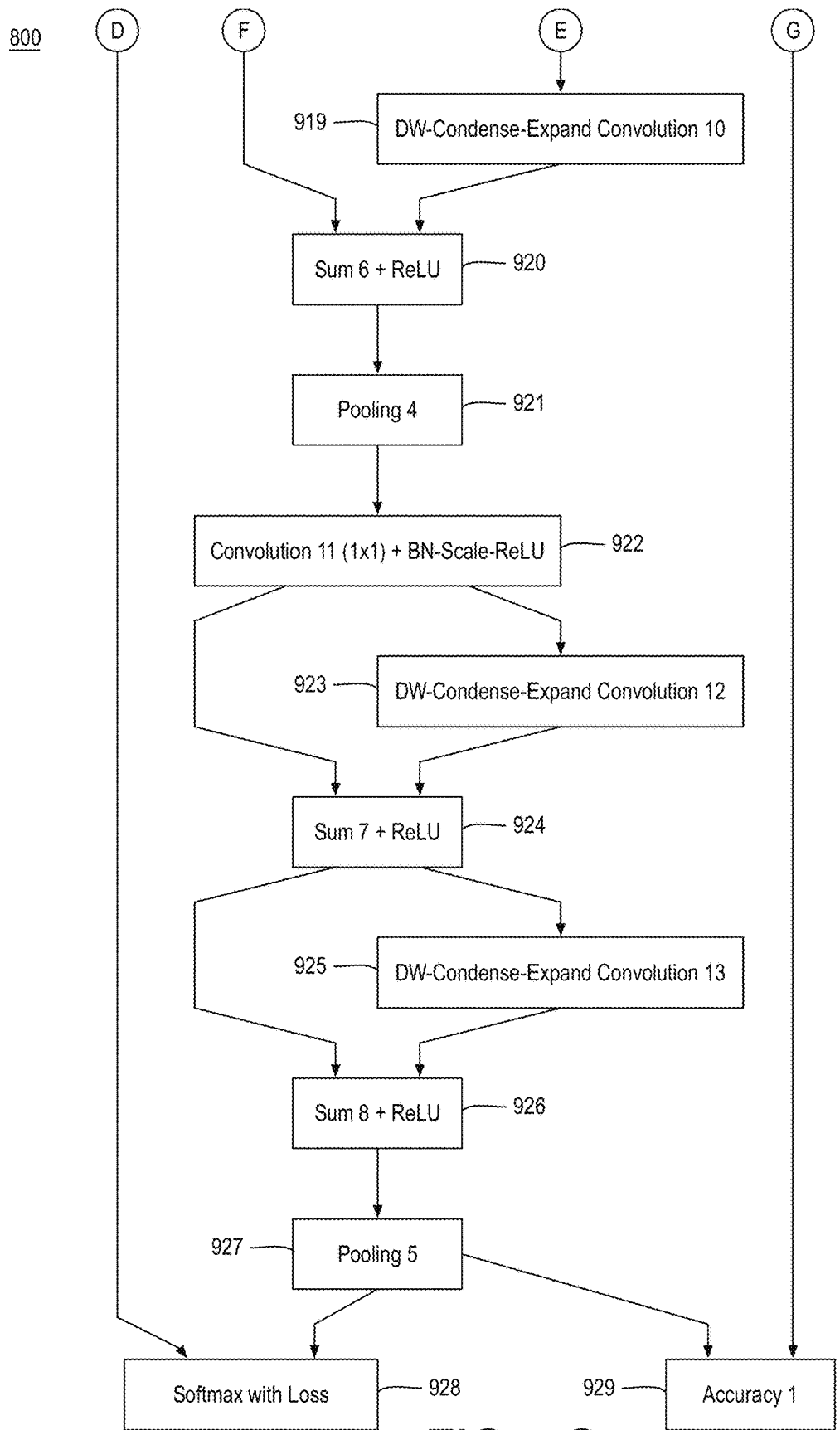

FIGS. 9A, 9B, and 9C illustrates an example convolutional neural network 900, arranged in accordance with at least some implementations of the present disclosure. As shown in FIGS. 9A, 9B, and 9C, convolutional neural network (CNN) 900 receives normalized input image data 112 via convolution layer 902, which applies n (e.g., 32) k×k (e.g., 3×3) convolution kernels to normalized input image data 112 (e.g., 128×128×1 image data). Pooling layer 903 receives the resultant data and provides a pooling (e.g., max pooling at stride 2) to generate output feature maps (e.g., 64×64×32 feature maps) from a first stage of CNN 900. In FIGS. 9A, 9B, and 9C, numeral instances (e.g., Convolution 1, Convolution 2, etc.) are to indicate each instantiation of such processing in CNN 900.

Convolution layer 904 receives the feature maps and applies, for example, 64 1×1×32 convolution kernels, batch normalization, scaling, and ReLU to the feature maps from the first stage and provides the resultant data (e.g., 64×64×64 data) to depth-wise-condense-expansion convolution layer 905 and summation and ReLu layer 906. Depth-wise-condense-expansion convolution layer 905 applies kernels (e.g., 64 kernels) of size k×k (e.g., 3×3) in a depth-wise separable convolution manner to generate separate feature maps as discussed herein. Then, depth-wise-condense-expansion convolution layer 905 applies a point-wise condense convolution (e.g., 16=64/4, where 4 is the condense factor, 1×1×64 kernels) to generate first combined feature maps (e.g., 64×64×16 data). Finally, depth-wise-condense-expansion convolution layer 905 applies a point-wise expansion convolution (e.g., 64 1×1×16 kernels) to generate second combined feature maps (e.g., 64×64×64 data). Notably, the output of convolution layer 904 and depth-wise-condense-expansion convolution layer 905 are the same size. Summation and ReLu layer 906 receives the output of convolution layer 904 and depth-wise-condense-expansion convolution layer 905, sums them, and applies ReLU to generate output data, which is provided to depth-wisecondense-expansion convolution layer 907 and summation and ReLu layer 908. Depth-wise-condense-expansion convolution layer 907 applies kernels (e.g., 64 kernels) of size k×k (e.g., 3×3) in a depth-wise separable convolution manner to generate separate feature maps as discussed herein. Then, depth-wise-condense-expansion convolution layer 907 applies a point-wise condense convolution (e.g., 16=64/4, where 4 is the condense factor, 1×1×64 kernels) to generate first combined feature maps (e.g., 64×64×16 data). Finally, depth-wise-condense-expansion convolution layer 907 applies a point-wise expansion convolution (e.g., 64 1×1×16 kernels) to generate second combined feature maps (e.g., 64×64×64 data). Notably, the output of summation and ReLu layer 906 and depth-wise-condense-expansion convolution layer 907 are the same size. Summation and ReLu layer 908 receives the output of summation and ReLu layer 906 and depth-wise-condense-expansion convolution layer 907, sums them, and applies ReLU to generate output data. Pooling layer 909 receives the resultant data and provides a pooling (e.g., max pooling at stride 2) to generate output feature maps (e.g., 32×32×64 feature maps) from a second stage of CNN 900.

Turning now to FIG. 9B, convolution layer 910 receives the feature maps and applies, for example, 128 1×1×64 convolution kernels, batch normalization, scaling, and ReLU to the feature maps from the second stage and provides the resultant data (e.g., 32×32×128 data) to depth-wise-condense-expansion convolution layer 911 and summation and ReLu layer 912. Depth-wise-condense-expansion convolution layer 911 applies kernels (e.g., 128 kernels) of size k×k (e.g., 3×3) in a depth-wise separable convolution manner to generate separate feature maps as discussed herein. Depth-wise-condense-expansion convolution layer 911 then applies a point-wise condense convolution (e.g., 32=128/4, where 4 is the condense factor, 1×1×128 kernels) to generate first combined feature maps (e.g., 32×32×32 data). Finally, depth-wise-condense-expansion convolution layer 911 applies a point-wise expansion convolution (e.g., 128 1×1×32 kernels) to generate second combined feature maps (e.g., 32×32×128 data). The output of convolution layer 910 and depth-wise-condense-expansion convolution layer 911 are the same size. Summation and ReLu layer 912 sums the output of convolution layer 910 and depth-wise-condense-expansion convolution layer 911 and applies ReLU to generate output data, which is provided to depth-wise-condense-expansion convolution layer 913 and summation and ReLu layer 914. Depth-wise-condense-expansion convolution layer 913 applies kernels (e.g., 128 kernels) of size k×k (e.g., 3×3) in a depth-wise separable convolution manner to generate separate feature maps as discussed herein. Depth-wise-condense-expansion convolution layer 913 then applies a point-wise condense convolution (e.g., 32=128/4, where 4 is the condense factor, 1×1×128 kernels) to generate first combined feature maps (e.g., 32×32×32 data). Finally, depth-wise-condense-expansion convolution layer 913 applies a point-wise expansion convolution (e.g., 128 1×1×32 kernels) to generate second combined feature maps (e.g., 32×32×128 data). The output of summation and ReLu layer 912 and depth-wise-condense-expansion convolution layer 913 are the same size. Summation and ReLu layer 914 sums the output of summation and ReLu layer 912 and depth-wise-condense-expansion convolution layer 913 and applies ReLU to generate output data. Pooling layer 915 receives the resultant data and provides a pooling (e.g., max pooling at stride 2) to generate output feature maps (e.g., 16×16×128 feature maps) from a third stage of CNN 900.

Convolution layer 916 receives the feature maps and applies, for example, 256 1×1×128 convolution kernels, batch normalization, scaling, and ReLU to the feature maps from the second stage and provides the resultant data (e.g., 16×6×256 data) to depth-wise-condense-expansion convolution layer 917 and summation and ReLu layer 918. Depth-wise-condense-expansion convolution layer 917 applies kernels (e.g., 256 kernels) of size k×k (e.g., 3×3) in a depth-wise separable convolution manner to generate separate feature maps as discussed herein. Depth-wise-condense-expansion convolution layer 917 then applies a point-wise condense convolution (e.g., 64=256/4, where 4 is the condense factor, 1×1×256 kernels) to generate first combined feature maps (e.g., 16×16×64 data). Finally, depth-wise-condense-expansion convolution layer 917 applies a point-wise expansion convolution (e.g., 256 1×1×64 kernels) to generate second combined feature maps (e.g., 16×16×256 data). The output of convolution layer 916 and depth-wise-condense-expansion convolution layer 917 are the same size. Summation and ReLu layer 918 sums the output of convolution layer 916 and depth-wise-condense-expansion convolution layer 917 and applies ReLU to generate output data, which is, turning to FIG. 9C, provided to depth-wise-condense-expansion convolution layer 919 and summation and ReLu layer 920. Depth-wise-condense-expansion convolution layer 919 applies kernels (e.g., 256 kernels) of size k×k (e.g., 3×3) in a depth-wise separable convolution manner to generate separate feature maps as discussed herein. Depth-wise-condense-expansion convolution layer 919 then applies a point-wise condense convolution (e.g., 64=256/4, where 4 is the condense factor, 1×1×256 kernels) to generate first combined feature maps (e.g., 16×16×64 data). Finally, depth-wise-condense-expansion convolution layer 919 applies a point-wise expansion convolution (e.g., 256 1×1×64 kernels) to generate second combined feature maps (e.g., 16×16×256 data). The output of summation and ReLu layer 918 and depth-wise-condense-expansion convolution layer 919 are the same size. Summation and ReLu layer 920 sums the output of summation and ReLu layer 918 and depth-wise-condense-expansion convolution layer 919 and applies ReLU to generate output data. Pooling layer 921 receives the resultant data and provides a pooling (e.g., max pooling at stride 2) to generate output feature maps (e.g., 8×8×256 feature maps) from a fourth stage of CNN 900.

Convolution layer 922 receives the feature maps and applies, for example, 512 1×1×256 convolution kernels, batch normalization, scaling, and ReLU to the feature maps from the second stage and provides the resultant data (e.g., 8×8×256 data) to depth-wise-condense-expansion convolution layer 923 and summation and ReLu layer 924. Depth-wise-condense-expansion convolution layer 923 applies kernels (e.g., 512 kernels) of size k×k (e.g., 3×3) in a depth-wise separable convolution manner to generate separate feature maps as discussed herein. Depth-wise-condense-expansion convolution layer 923 then applies a point-wise condense convolution (e.g., 128=512/4, where 4 is the condense factor, 1×1×512 kernels) to generate first combined feature maps (e.g., 8×8×128 data). Finally, depth-wise-condense-expansion convolution layer 923 applies a point-wise expansion convolution (e.g., 512 1×1×128 kernels) to generate second combined feature maps (e.g., 8×8×512 data). The output of convolution layer 922 and depth-wise-condense-expansion convolution layer 923 are the same size. Summation and ReLu layer 924 sums the output of convolution layer 922 and depth-wise-condense-expansion convolution layer 923 and applies ReLU to generate output data, which is provided to depth-wise-condense-expansion convolution layer 925 and summation and ReLu layer 926. Depth-wise-condense-expansion convolution layer 925 applies kernels (e.g., 512 kernels) of size k×k (e.g., 3×3) in a depth-wise separable convolution manner to generate separate feature maps as discussed herein. Depthwise-condense-expansion convolution layer 925 then applies a point-wise condense convolution (e.g., 128=512/4, where 4 is the condense factor, 1×1×512 kernels) to generate first combined feature maps (e.g., 8×8×128 data). Finally, depth-wise-condense-expansion convolution layer 925 applies a point-wise expansion convolution (e.g., 512 1×1× 128 kernels) to generate second combined feature maps (e.g., 8×8×512 data). The output of summation and ReLu layer 924 and depth-wise-condense-expansion convolution layer 925 are the same size. Summation and ReLu layer 926 sums the output of summation and ReLu layer 924 and depth-wise-condense-expansion convolution layer 925 and applies ReLU to generate output data. Pooling layer 927 receives the resultant data and provides a pooling (e.g., global average pooling) to generate output features such as an output feature vector, which is provided to softmax module 928 and accuracy module 929. Softmax module 928 may implement a softmax function to the output feature vector to an output feature vector of values in the range (0, 1] such that all the entries add up to 1. The resultant output feature vector may be used (e.g., by controller 104) to determine a best match of the output feature vector (e.g., a highest value that also exceeds a threshold) or to determine whether match is found.

Table 1 summarizes CNN 900, the number of multiply and add operations (#MAdd), the number of parameters (#Parameters), and the number of residual addition operations (Residual-ADD at each stage. In Table 1, (k, n) indicates a standard convolution, where the first number 'k' indicates the squared 2D kernel size (e.g., k×k) and the 2nd number 'n' indicates the number of output-channels. For example, in Conv11, (3, 32) indicates 3×3 kernels with 32 output channels. Furthermore, <k, n> indicates a depth-wise separable convolution as discussed herein, where the first number 'k' indicates 2D kernel size and the 2nd number 'n' is the output channel number. For example, <3, 32> indicates 3×3 2D kernels with 32 separable 2D convolutions. As shown in Table 1, each depth-wise convolution is followed by one condense point-wise convolution and one expansion point-wise convolution as discussed herein. In the network, each convolution layer is followed by batch-normalization layer (BN), scaling layer, ReLU activations, which are not shown for clarity of presentation. Furthermore, the presented network has only 110M #MAdd and 530K #Parameters, which provides significant computational complexity and model compression with respect to prior networks. The accuracy of the networks discussed herein, benchmarked using available object detection data sets provide for 98.9% accuracy, 93.6% TPR@FPR=0.1% (i.e., number of correct positives while testing 1,000 objects with only 1 false alarm), and 73.6% rank-1 DIR@FAR=1%.

TABLE 1

CEDNet (g = 4) Summary

| Stage | CONV <k, n> | #MAdd | #Parameters | Residual-ADD |
|---|---|---|---|---|
| Input | 128*128*1 (gray scale input to align with Near InfraRed input) | | | |
| Stage1 (128*128) Conv11 | (3, 32) | 4.5M | 0.3K | |
| 2 × 2 max-Pooling (stride = 2) | | | | |
| Stage2 (64*64) | (1, 64) | 8M | 2.1K | |
| | <3, 64> | 2.25M | 0.6K | |
| Conv21 | (1, 16) | 4M | 1.0K | |
| Conv22-DW | (1, 64) | 4M | 1.0K | 0.25M |
| Conv23-DW | <3, 64> | 2.25M | 0.6K | |
| | (1, 16) | 4M | 1.0K | |
| | (1, 64) | 4M | 1.0K | 0.25M |
| Stage2-TOTAL | | 29M | 7.3K | 0.5M |
| 2 × 2 max-Pooling (stride = 2) | | | | |
| Stage3 (32*32) | (1, 128) | 8M | 8.1K | |
| | <3, 128> | 1.13M | 1.25K | |
| Conv31 | (1, 32) | 4M | 4.1K | |
| Conv32-DW | (1, 128) | 4M | 4.1K | 0.125M |
| Conv33-DW | <3, 128> | 1.13M | 1.25K | |
| | (1, 32) | 4M | 4.1K | |
| | (1, 128) | 4M | 4.1K | 0.125M |
| Stage3-TOTAL | | 26M | 27K | 0.25M |
| 2 × 2 max-Pooling (stride = 2) | | | | |
| Stage4 (16*16) | (1, 256) | 8M | 32.3K | |
| | <3, 256> | 0.56M | 2.5K | |
| Conv41 | (1, 64) | 4M | 16K | |
| Conv42-DW | (1, 256) | 4M | 16K | 0.0625M |
| Conv43-DW | <3, 256> | 0.56M | 2.5K | |
| | (1, 64) | 4M | 16K | 0.0625M |
| | (1, 256) | 4M | 16K | |
| Stage4-TOTAL | | 25M | 101.3K | 0.125M |
| 2 × 2 max-Pooling (stride = 2) | | | | |
| Stage5 (8*8) | (1, 512) | 8M | 128.5K | |
| | <3, 512> | 0.28M | 5K | |
| Conv51 | (1, 128) | 4M | 64K | |
| Conv52-DW | (1, 512) | 4M | 64K | 32K |
| Conv53-DW | <3, 512> | 0.28M | 5K | |
| | (1, 128) | 4M | 64K | |
| | (1, 512) | 4M | 64K | 32K |
| Stage5-TOTAL | | 25M | 394.5K | 0.0625M |
| Global Average-Pooling | | | | |
| Total | — | 110M | 530K | 0.9375M |

Figure 10:
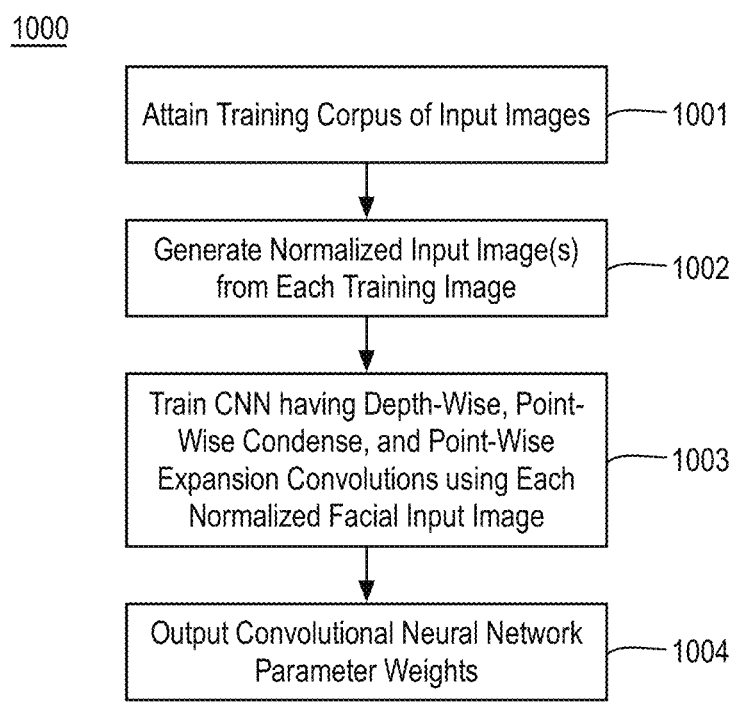
FIG. 10 is a flow diagram illustrating an example process for training a convolutional neural network including depth-wise-condense-expansion convolutions.

FIG. 10 is a flow diagram illustrating an example process 1000 for training a convolutional neural network including depth-wise-condense-expansion convolutions, arranged in accordance with at least some implementations of the present disclosure. Process 1000 may include one or more operations 1001-1004 as illustrated in FIG. 10. Process 1000 may be performed by any device or system discussed herein to train any CNN having depth-wise-condense-expansion convolutions as discussed herein. Process 1000 or portions thereof may be repeated for any CNN training, training sets, etc. Process 1000 may be used to train any CNN discussed herein. The parameter weights generated by process 1000 may be stored to memory and implemented via a processor, for example.

Process 1000 begins at operation 1001, where a training corpus of input images having any characteristics discussed with respect to image data 111 are attained. The training corpus or training data may include any suitable corpus of image data 111 such as images having objects (e.g., faces) that are to be detected by the CNN labeled with accurate labels as well as false labels. Processing continues at operation 1002, where one or more normalized input images are extracted from each of the training images. Such normalization may be performed using any suitable technique or techniques and may match those to be implemented in an implementation phase such as those discussed with respect to detection and normalization module 102. Although discussed with respect to face detection and recognition, any object type may be detected and recognized using the technique discussed herein.

Processing continues at operation 1003, where each normalized input image segment (e.g., normalized input image data) attained at operation 1002 is used to train the CNN. In an embodiment, CNN parameter weights for implementation of the CNN, including filter weights and fully connected layer weights are generated using each image segment based on back propagation training techniques. For example, CNN filter sizes, numbers, strides, and channels may be preformatted or preselected for a multi-stage CNN. For example, any characteristics discussed herein with respect to CNN 300, CNN stage 400, CNN stage 800, CNN 900, or any other CNN with respect to kernel sizes, numbers, pooling characteristics, strides, and channels may be selected.

During training, such CNN characteristics may be used and CNN parameter weights may be trained. for example, the CNN characteristics may be fixed and the CNN parameter weights may be initially randomized to establish random CNN parameter weights. Then, at each training stage, the CNN is applied, in a forward pass, to an image segment that is passed through the entire CNN. The CNN output data are then provided to a loss function using the known object label to define a loss or error using any suitable technique or techniques such as mean squared error. A backward pass through the CNN may then be made to determine weights that contributed the most to the loss or error and modifying them to reduce or minimize the loss or error. The CNN parameter weights are thereby adjusted and processing continues with addition training image segments. Furthermore, some or all training image segments may be used again in an iterative manner. Such processing may continue until a loss target is met for a particular subset of images, after a fixed number of iterations, or the like.

Processing continues at operation 1004, where the resultant CNN parameter weights are output. For example, the selected CNN characteristics and resultant CNN parameter weights after training may be stored to memory and/or transmitted to another device for implementation.

Figure 11:
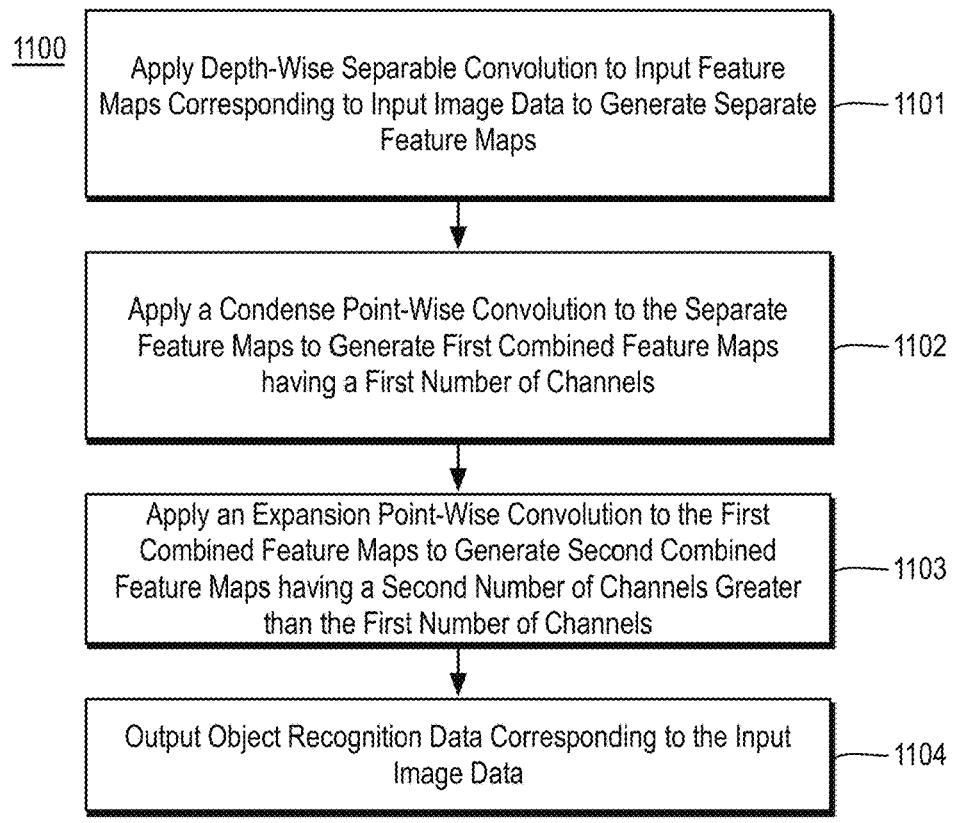
FIG. 11 is a flow diagram illustrating an example process for implementing a convolutional neural network having depth-wise-condense-expansion convolutions.

FIG. 11 is a flow diagram illustrating an example process 1100 for implementing a convolutional neural network having depth-wise-condense-expansion convolutions, arranged in accordance with at least some implementations of the present disclosure. Process 1100 may include one or more operations 1101-1104 as illustrated in FIG. 11. Process 1100 may form at least part of a convolutional neural network process. By way of non-limiting example, process 1100 may form at least part of a face recognition process performed by device 100 as discussed herein during an implementation phase of the convolutional neural network. Furthermore, process 1100 will be described herein with reference to system 1200 of FIG. 12.

Figure 12:
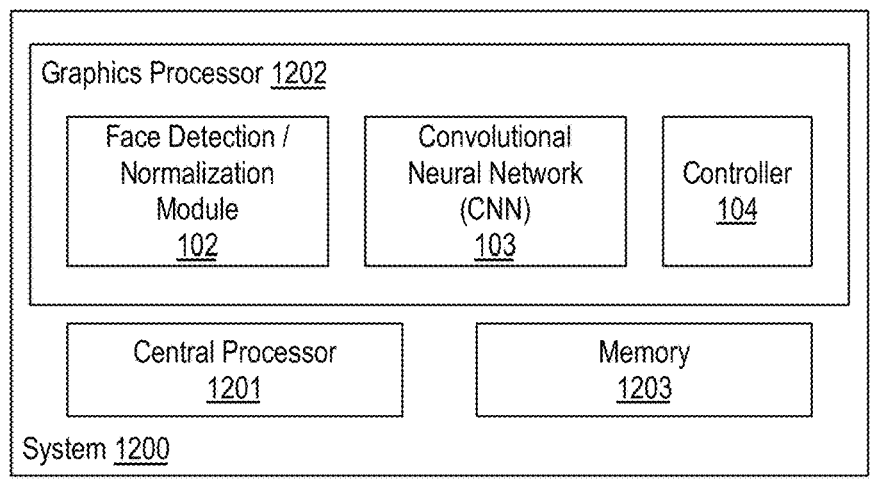
FIG. 12 is an illustrative diagram of an example system for implementing a convolutional neural network having depth-wise-condense-expansion convolutions.

FIG. 12 is an illustrative diagram of an example system 1200 for implementing a convolutional neural network having depth-wise-condense-expansion convolutions, arranged in accordance with at least some implementations of the present disclosure. As shown in FIG. 12, system 1200 may include one or more central processing units (CPU) 1201, a graphics processing unit 1202, and memory stores 1203. Also as shown, graphics processing unit 1202 may include or implement face detection and normalization module 102, CNN module 103, and controller 104. Such modules may be implemented to perform operations as discussed herein. In the example of system 1200, memory stores 1203 may store input image data, normalized input image data, CNN output data, CNN weighs, CNN kernels, 3D image segment data, CNN characteristics and parameters data, binary neural features, object recognition data, or any other data or data structure discussed herein.

As shown, in some examples, face detection and normalization module 102, CNN module 103, and controller 104 are implemented via graphics processing unit 1202. In other examples, one or more or portions of face detection and normalization module 102, CNN module 103, and controller 104 are implemented via central processing units 1201 or an image processing unit (not shown) of system 1200. In yet other examples, one or more or portions of face detection and normalization module 102, CNN module 103, and controller 104 are implemented via an imaging processing pipeline, graphics pipeline, or the like.

Graphics processing unit 1202 may include any number and type of graphics processing units, that may provide the operations as discussed herein. Such operations may be implemented via software or hardware or a combination thereof. For example, graphics processing unit 1202 may include circuitry dedicated to manipulate image data, CNN data, etc. obtained from memory stores 1203. Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory. In an embodiment, one or more or portions of face detection and normalization module 102, CNN module 103, and controller 104 are implemented via an execution unit (EU) of graphics processing unit 1202. The EU may include, for example, programmable logic or circuitry such as a logic core or cores that may provide a wide array of programmable logic functions. In an embodiment, one or more or portions of face detection and normalization module 102, CNN module 103, and controller 104 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of face detection and normalization module 102, CNN module 103, and controller 104 are implemented via an application specific integrated circuit (ASIC). The ASIC may include an integrated circuitry customized to perform the operations discussed herein.

Returning to discussion of FIG. 11, process 1100 begins at operation 1101, where a depth-wise separable convolution is applied to multiple input feature maps to generate a plurality of separate 2D feature maps such that the input feature maps are associated with input image data. The input image data may be any suitable input image data discussed herein. In an embodiment, the input image data is RGB image data. In an embodiment, the input image data is RGB-D image data. In an embodiment, an input image is normalized to include a detected object that is to be recognized (e.g., a face) to generate the input image data. The input feature maps correspond to the input image data in that the input feature maps are generated by a CNN when processing the input image data. The depth-wise separable convolution may be applied to the input feature maps at any stage of the CNN and the input feature maps may be of any dimensions (e.g., height, width, and channels). The depth-wise separable convolution may be applied using any suitable technique or techniques such that information is not shared across the input channels of the input feature maps. In an embodiment, applying the depth-wise separable convolution comprises a number of kernels (e.g., k×k×1 kernels) to each of the input feature maps.

Processing continues at operation 1102, where a condense point-wise convolution is applied to the separate 2D feature maps to generate multiple combined feature maps (e.g., first combined feature maps) having a first number of channels. The condense point-wise convolution may be applied using any suitable technique or techniques such that information is shared across the channels of the separate 2D feature maps. In an embodiment, applying the condense point-wise convolution includes applying a first number, n/g, of kernels to the separate 2D feature maps such that g is a condense factor that is greater than 1. In an embodiment, n is the number of kernels applied at operation 1101 and the number of channels of the input feature maps received at operation 1101.

Processing continues at operation 1103, where an expansion point-wise convolution is applied to the combined feature maps generated at operation 1102 to generate multiple combined feature maps (e.g., second combined feature maps) having a second number of channels greater than the first number of channels. The expansion point-wise convolution may be applied using any suitable technique or techniques such that information is shared across the channels of the combined feature maps generated at operation 1102. In an embodiment, applying the expansion point-wise convolution includes applying the second number, n, of 1×1×(n/g) kernels to the combined feature maps.

Processing continues at operation 1104, where object recognition data is output corresponding to the input image data based at least in part on the combined feature maps generated at operation 1103. For example, the CNN may provide further processing to generate CNN output data, which may be used to generate object recognition data. The object recognition data may include any suitable data indicative of an object (e.g., face) being recognized (or not) or indicative of a particular object (e.g., face) being recognized. In an embodiment, the object recognition data includes an indicator of whether the input image data corresponds to a face of a user. In an embodiment, the object recognition data includes a label corresponding to one of a plurality of candidate faces.

As discussed, the combined feature maps generated at operation 1103 may be further processed by the CNN. In an embodiment, process 1100 further includes performing a residual connection by adding the input feature maps received at operation 1101 and the combined feature maps generated at operation 1103 to generate output feature maps and providing the output feature maps or a second output feature maps corresponding to the output feature maps (e.g., the second output feature maps being generated by further processing the second output feature maps by ReLU or the like) to a second depth-wise separable convolution of the CNN. In some embodiments, process 1100 further includes applying, in turn, the second depth-wise separable convolution, a second condense point-wise convolution, and a second expansion point-wise convolution to the output feature maps or the second output feature maps to generate third output feature maps such that the third output feature maps has a third number of channels greater than the second number of channels discussed above. In an embodiment, the second condense point-wise convolution generates third combined feature maps having a third number of channels, the second expansion point-wise convolution generates fourth combined feature maps having a fourth number of channels and a ratio of the second number of channels to the first number of channels is the same as a ratio of the fourth number of channels to the third number of channels (e.g., both ratios are the condense factor, g). In an embodiment, process 1100 further includes applying, in turn, a second depth-wise separable convolution, a second condense point-wise convolution, and a second expansion point-wise convolution to the second combined feature maps to generate third combined feature maps such that the third output feature maps has a third number of channels equal to the second number of channels.

Process 1100 may provide for generating object (e.g., face) recognition data or object label data based on input image data. Process 1100 may be repeated any number of times either in series or in parallel for any number of input image data segments, input images, or the like. As discussed, process 1100 may provide for high quality object recognition results with low computational and memory requirements.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
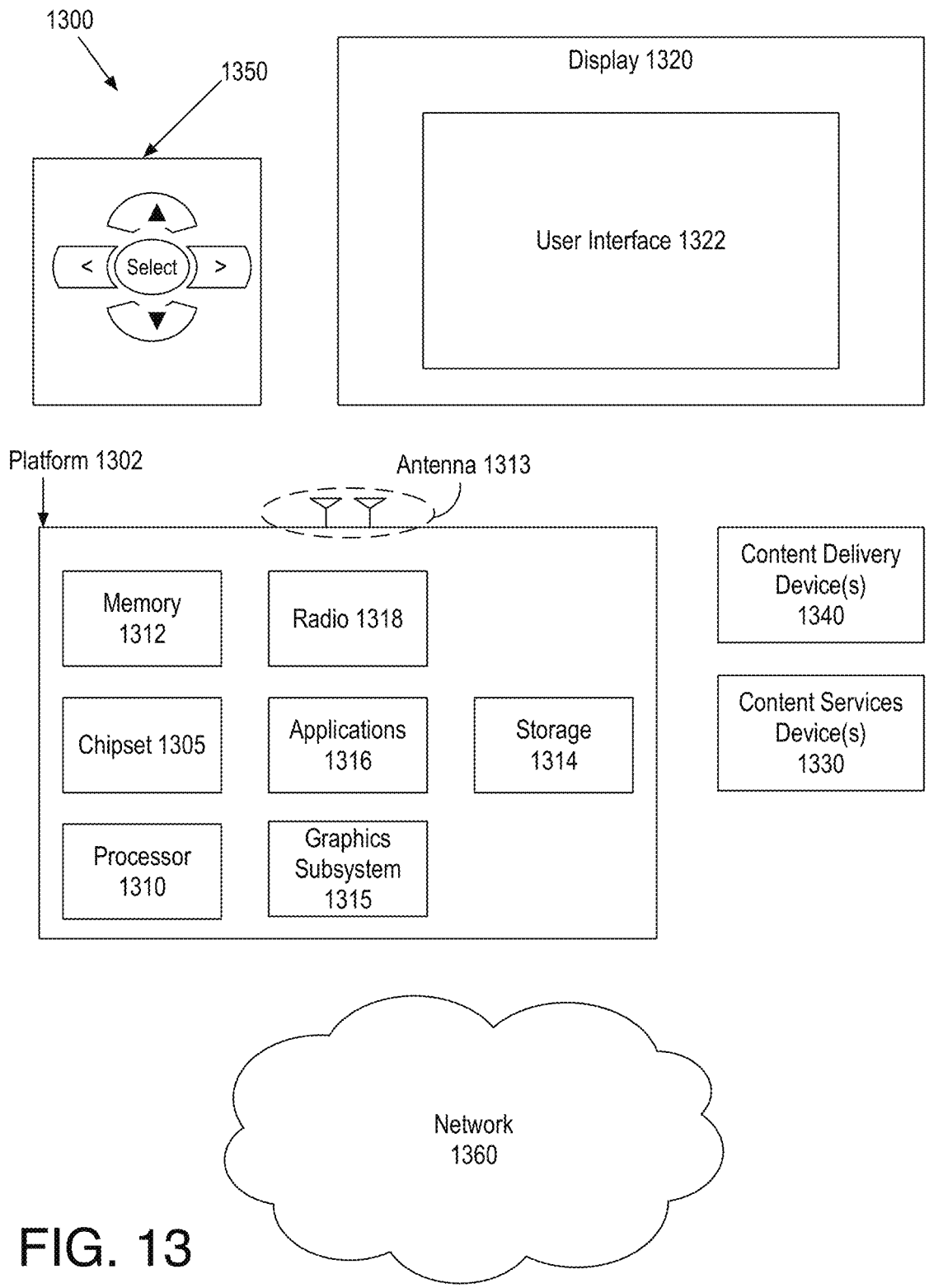
FIG. 13 is an illustrative diagram of an example system.

FIG. 13 is an illustrative diagram of an example system 1300, arranged in accordance with at least some implementations of the present disclosure. In various implementations, system 1300 may be a computing system although system 1300 is not limited to this context. For example, system 1300 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaining console, wearable device, display device, all-in-one device, two-in-one device, and so forth.

In various implementations, system 1300 includes a platform 1302 coupled to a display 1320. Platform 1302 may receive content from a content device such as content services device(s) 1330 or content delivery device(s) 1340 or other similar content sources such as a camera or camera module or the like. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still images, graphics, or video for display. Graphics subsystem 1315 may be a graphics processing unit (GPU), a visual processing unit (VPU), or an image processing unit, for example. In some examples, graphics subsystem 1315 may perform scanned image rendering as discussed herein. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any flat panel monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 12.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
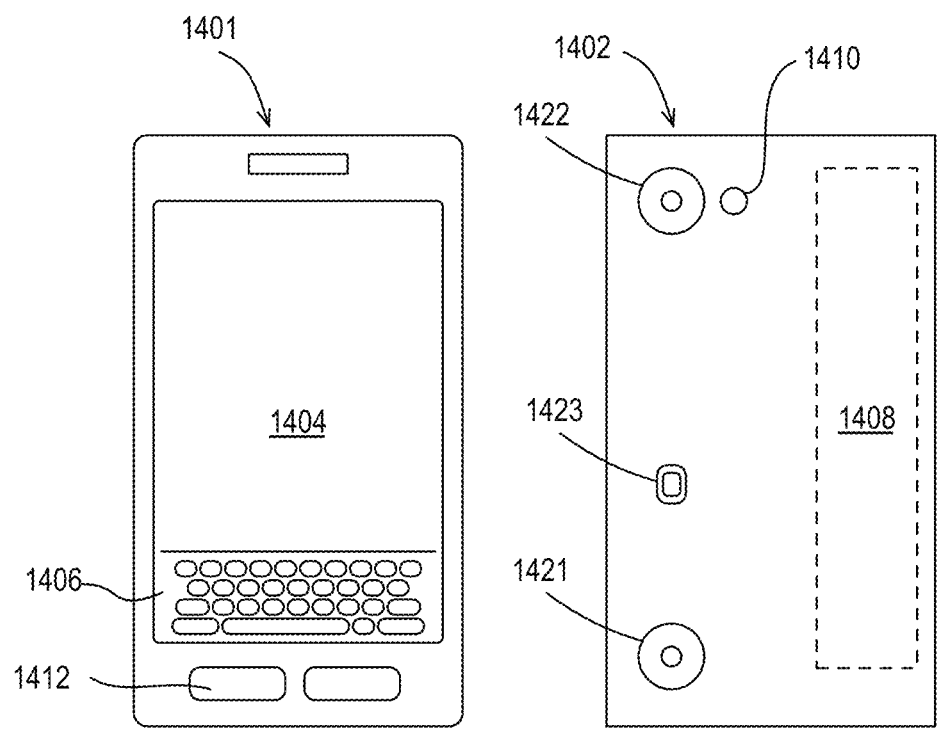
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, an infrared transmitter 1423, and an integrated antenna 1408. In some embodiments, color camera 1421, color camera 1422, and infrared transmitter 1423 attain 3D image data as discussed herein. In some embodiments, device 1400 does not include color camera 1421 and 1423 and device 1400 attains input image data (e.g., RGB input image data) as discussed herein. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, infrared transmitter 1423, and a flash 1410 integrated into back 1402 (or elsewhere) of device 1400. In other examples, color cameras 1421, 1422, infrared transmitter 1423, and flash 1410 may be integrated into front 1401 of device 1400 or both front and back sets of cameras may be provided. Color cameras 1421, 1422 and a flash 1410 may be components of a camera module to originate color image data with R texture correction that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for implementing a convolutional neural network (CNN) comprising:
a memory to store input image data; and
a processor coupled to the memory, the processor to:
apply a depth-wise separable convolution to a plurality of input feature maps to generate a plurality of separate two dimensional (2D) feature maps, wherein the plurality of input feature maps is associated with the input image data;
apply a condense point-wise convolution to the plurality of separate 2D feature maps to generate a first plurality of combined feature maps, wherein the first plurality of combined feature maps has a first number of channels;
apply an expansion point-wise convolution to the first plurality of combined feature maps to generate a second plurality of combined feature maps, wherein the second plurality of combined feature maps has a second number of channels, and the second number is greater than the first number; and
output object recognition data corresponding to the input image data based at least in part on the second plurality of combined feature maps.

2. The system of claim 1, wherein the plurality of input feature maps has a number of channels, and the number matches the second number.

3. The system of claim 2, wherein the processor is to:
perform a residual connection by summation of the plurality of input feature maps and the second plurality of combined feature maps to generate a plurality of output feature maps; and
provide the plurality of output feature maps or a second plurality of output feature maps corresponding to the plurality of output feature maps to a second depth-wise separable convolution of the CNN.

4. The system of claim 3, wherein the processor is to:
apply, in turn, the second depth-wise separable convolution, a second condense point-wise convolution, and a second expansion point-wise convolution to the plurality of output feature maps or the second plurality of output feature maps to generate a third plurality of output feature maps, wherein the third plurality of output feature maps has a third number of channels, and the third number is greater than the second number.

5. The system of claim 4, wherein the second condense point-wise convolution generates a third plurality of combined feature maps having a fourth number of channels, the second expansion point-wise convolution generates a fourth plurality of combined feature maps having a fifth number, and a ratio of the second number to the first number is the same as a ratio of the fifth number to the fourth number.

6. The system of claim 1, wherein the processor is to: apply, in turn, a second depth-wise separable convolution, a second condense point-wise convolution, and a second expansion point-wise convolution to the second plurality of combined feature maps to generate a third plurality of combined feature maps, wherein the third plurality of output feature maps has a third number of channels, and the third number is equal to the second number.

7. The system of claim 1, wherein the processor to apply the depth-wise separable convolution comprises the processor to apply the second number, n, of k×k×1 kernels to each of the plurality of input feature maps, the processor to apply the condense point-wise convolution comprises the processor to apply the first number, n/g, of 1×1×n kernels to the plurality of separate 2D feature maps, and the processor to apply the expansion point-wise convolution comprises the processor to apply the second number, n, of 1×1×(n/g) kernels to the plurality of separate 2D feature maps.

8. The system of claim 7, wherein a ratio of the second number, n, to the first number, n/g, comprises a condense factor, g, that is greater than two.

9. The system of claim 1, wherein the input image data comprises one of RGB image data, RGB-D image data, or infra-red image data.

10. The system of claim 1, wherein the object recognition data comprises one of an indicator of whether the input image data corresponds to a face of a user or a label corresponding to one of a plurality of candidate faces.

11. A computer-implemented method for implementing a convolutional neural network (CNN) comprising:
applying a depth-wise separable convolution to a plurality of input feature maps to generate a plurality of separate two-dimensional (2D) feature maps, wherein the plurality of input feature maps is associated with input image data;
applying a condense point-wise convolution to the plurality of separate 2D feature maps to generate a first plurality of combined feature maps, wherein the first plurality of combined feature maps has a first number of channels;
applying an expansion point-wise convolution to the first plurality of combined feature maps to generate a second plurality of combined feature maps, wherein the second plurality of combined feature maps has a second number of channels, and the second number is greater than the first number; and
outputting object recognition data corresponding to the input image data based at least in part on the second plurality of combined feature maps.

12. The method of claim 11, wherein the plurality of input feature maps has a number of channels, and the number matches the second number.

13. The method of claim 12, further comprising:
performing a residual connection by summation of the plurality of input feature maps and the second plurality of combined feature maps to generate a plurality of output feature maps; and
providing the plurality of output feature maps or a second plurality of output feature maps corresponding to the plurality of output feature maps to a second depth-wise separable convolution of the CNN.

14. The method of claim 13, further comprising:
applying, in turn, the second depth-wise separable convolution, a second condense point-wise convolution, and a second expansion point-wise convolution to the plurality of output feature maps or the second plurality of output feature maps to generate a third plurality of output feature maps, wherein the third plurality of output feature maps has a third number of channels, and the third number is greater than the second number.

15. The method of claim 14, wherein the second condense point-wise convolution generates a third plurality of combined feature maps having a fourth number of channels, the second expansion point-wise convolution generates a fourth plurality of combined feature maps having a fifth number of channels, and a ratio of the second number to the first number is the same as a ratio of the fifth number to the fourth number.

16. At least one machine readable medium comprising a plurality of instructions that, in response to being executed on a computing device, cause the computing device to implement a convolutional neural network (CNN) by:
applying a depth-wise separable convolution to a plurality of input feature maps to generate a plurality of separate two-dimensional (2D) feature maps, wherein the plurality of input feature maps is associated with input image data;
applying a condense point-wise convolution to the plurality of separate 2D feature maps to generate a first plurality of combined feature maps, wherein the first plurality of combined feature maps has a first number of channels;
applying an expansion point-wise convolution to the first plurality of combined feature maps to generate a second plurality of combined feature maps, wherein the second plurality of combined feature maps has a second number of channels, and the second number is greater than the first number; and
outputting object recognition data corresponding to the input image data based at least in part on the second plurality of combined feature maps.

17. The machine readable medium of claim 16, wherein the plurality of input feature maps has a number of channels, and the number matches the second number.

18. The machine readable medium of claim 17, further comprising instructions that, in response to being executed on the computing device, cause the computing device to implement the convolutional neural network (CNN) by:
performing a residual connection by summation of the plurality of input feature maps and the second plurality of combined feature maps to generate a plurality of output feature maps; and
providing the plurality of output feature maps or a second plurality of output feature maps corresponding to the plurality of output feature maps to a second depth-wise separable convolution of the CNN.

19. The machine readable medium of claim 18, further comprising instructions that, in response to being executed on the computing device, cause the computing device to implement the convolutional neural network (CNN) by:
applying, in turn, the second depth-wise separable convolution, a second condense point-wise convolution, and a second expansion point-wise convolution to the plurality of output feature maps or the second plurality of output feature maps to generate a third plurality of output feature maps, wherein the third plurality of output feature maps has a third number of channels, and the third number is greater than the second number.

20. The machine readable medium of claim 19, wherein the second condense point-wise convolution generates a third plurality of combined feature maps having a fourth number of channels, the second expansion point-wise convolution generates a fourth plurality of combined feature maps having a fifth number of channels, and a ratio of the second number to the first number is the same as a ratio of the fifth number to the fourth number.

* * * * *